United States Patent
Liao et al.

(10) Patent No.: US 11,553,211 B2
(45) Date of Patent: Jan. 10, 2023

(54) HEURISTIC DETECTION OF POTENTIAL DIGITAL MEDIA ARTIFACTS AND DEFECTS IN DIGITAL MEDIA ASSETS

(71) Applicant: Disney Enterprises, Inc., Burbank, CA (US)

(72) Inventors: Kevin Liao, Rancho Palos Verdes, CA (US); Jared McPhillen, Glendale, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1111 days.

(21) Appl. No.: 13/733,845

(22) Filed: Jan. 3, 2013

(65) Prior Publication Data
US 2014/0185678 A1    Jul. 3, 2014

(51) Int. Cl.
*H04N 19/89* (2014.01)
*H04N 19/513* (2014.01)
*H04N 17/00* (2006.01)
*H04N 19/194* (2014.01)

(52) U.S. Cl.
CPC .......... *H04N 19/89* (2014.11); *H04N 17/004* (2013.01); *H04N 19/513* (2014.11); *H04N 19/194* (2014.11)

(58) Field of Classification Search
None
See application file for complete search history.

(56) References Cited

U.S. PATENT DOCUMENTS

| | | | | |
|---|---|---|---|---|
| 5,283,646 A * | 2/1994 | Bruder | ................. | H04N 19/197 341/76 |
| 5,502,573 A * | 3/1996 | Fujinami | .............. | H04N 5/9264 375/E7.271 |
| 5,819,004 A * | 10/1998 | Azadegan | ............ | G11B 27/031 386/329 |
| 6,246,803 B1 * | 6/2001 | Gauch | .................... | H04N 17/00 348/E17.001 |
| 6,704,281 B1 * | 3/2004 | Hourunranta | ............ | H04N 7/52 370/230 |
| 6,744,924 B1 * | 6/2004 | Hannuksela | ........... | H04N 19/89 375/E7.279 |
| 6,757,027 B1 * | 6/2004 | Edwards | ................ | H04N 5/262 348/701 |
| 6,959,020 B1 * | 10/2005 | Hourunranta | .......... | H04N 19/89 370/542 |
| 8,848,061 B2 * | 9/2014 | Kolarov | ............... | H04N 17/004 348/180 |
| 9,438,904 B2 * | 9/2016 | Liu | ....... | H04N 19/593 |
| 2002/0021755 A1 * | 2/2002 | Hourunranta | .......... | H04N 19/89 375/240.12 |
| 2003/0198463 A1 * | 10/2003 | Temple | ................ | G11B 27/034 386/241 |

(Continued)

*Primary Examiner* — Shadan E Haghani
(74) *Attorney, Agent, or Firm* — Farjami & Farjami LLP (57) ABSTRACT

A method, comprises monitoring a encoding process of a source video file performed by an encoder; obtaining an encoding decision parameter used to encode a picture of the source video file during the encoding process; comparing the encoding decision parameter to a threshold; based on the step of comparing, identifying the picture as a candidate picture for a visual defect or coding error; and storing a timestamp of the candidate picture.

16 Claims, 4 Drawing Sheets

(56) References Cited

U.S. PATENT DOCUMENTS

| | | | | |
|---|---|---|---|---|
| 2004/0101055 | A1* | 5/2004 | Hourunranta | H04N 19/89 |
| | | | | 375/240.24 |
| 2005/0220324 | A1* | 10/2005 | Klein | G07D 11/30 |
| | | | | 382/112 |
| 2008/0260042 | A1* | 10/2008 | Shah | H04N 19/197 |
| | | | | 375/240.25 |
| 2010/0092099 | A1* | 4/2010 | Richter | H04N 19/129 |
| | | | | 382/244 |
| 2010/0166060 | A1* | 7/2010 | Ezure | H04N 19/196 |
| | | | | 375/240.03 |
| 2010/0223649 | A1* | 9/2010 | Suitts | H04N 21/23418 |
| | | | | 725/105 |
| 2012/0020415 | A1* | 1/2012 | Yang | H04N 17/004 |
| | | | | 375/240.27 |
| 2012/0155553 | A1* | 6/2012 | Liao | H04N 21/6125 |
| | | | | 375/240.26 |
| 2012/0263237 | A1* | 10/2012 | Koyama | H04N 19/61 |
| | | | | 375/240.16 |
| 2013/0128993 | A1* | 5/2013 | Kau | H04N 19/48 |
| | | | | 375/240.26 |
| 2013/0148741 | A1* | 6/2013 | Steinberg | H04N 19/40 |
| | | | | 375/240.25 |
| 2013/0293725 | A1* | 11/2013 | Zhang | H04N 17/02 |
| | | | | 348/180 |
| 2018/0219684 | A1* | 8/2018 | Walrant | H04L 9/14 |

* cited by examiner

HEURISTIC DETECTION OF POTENTIAL DIGITAL MEDIA ARTIFACTS AND DEFECTS IN DIGITAL MEDIA ASSETS

TECHNICAL FIELD

The present disclosure relates generally to digital media encoding, and more particularly, some embodiments relate to systems and methods for detecting and marking artifacts or defects in encoded digital media files.

DESCRIPTION OF THE RELATED ART

Due to the growing number of digital media distribution platforms that are available, a single piece of media content, such as a movie, is often digitized or transcoded into different formats and bit-rates. Before these new, compressed assets can be used for distribution, their quality and integrity need to be verified and must pass a defined threshold of perceived quality.

BRIEF SUMMARY OF THE DISCLOSURE

Some implementations monitor the quantification processes that occur during encoding a digital media file. Based on parameters that depend on the change between samples of the digital media file, implementations detect the location of possible artifacts or defects in the outputted encoded media file. Some implementations detect a possible artifact or defect by comparing the parameter to a threshold. The timecode locations of the possible artifacts or defects may be stored with the encoded media file, for example, as bookmarks or chapter marks as provided for in an applicable digital media standard.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

A lossy encoding process sacrifices information to compress data. Many digital media encoding techniques follow a common chain of steps: (1) prediction; (2) transformation and quantization; and (3) entropy coding. Additionally, many encoders are programmed to be operable under various constraints, such as file size, average bitrate, and maximum bitrate constraints. Meeting these constraints often requires compromising between output quality and compression. These quality compromises often result in digital media artifacts or defects, such as ringing, blocking, or break-up of the picture. Often, scenes with a great deal of activity are particularly susceptible to such glitches.

Many content distributors create multiple versions of a single video, song, or other digital media program for multiple avenues of distribution. For example, a video distributor might maintain a plurality of different files having the same resolution but different bitrates for web distribution using an adaptive variable bitrate streaming technique. The video distributor might have similar multiple bitrate file groups at different resolutions for distribution to different types of devices. Performing quality assurance (QA) on the resulting large number of files can be time consuming and costly.

Figure 1:
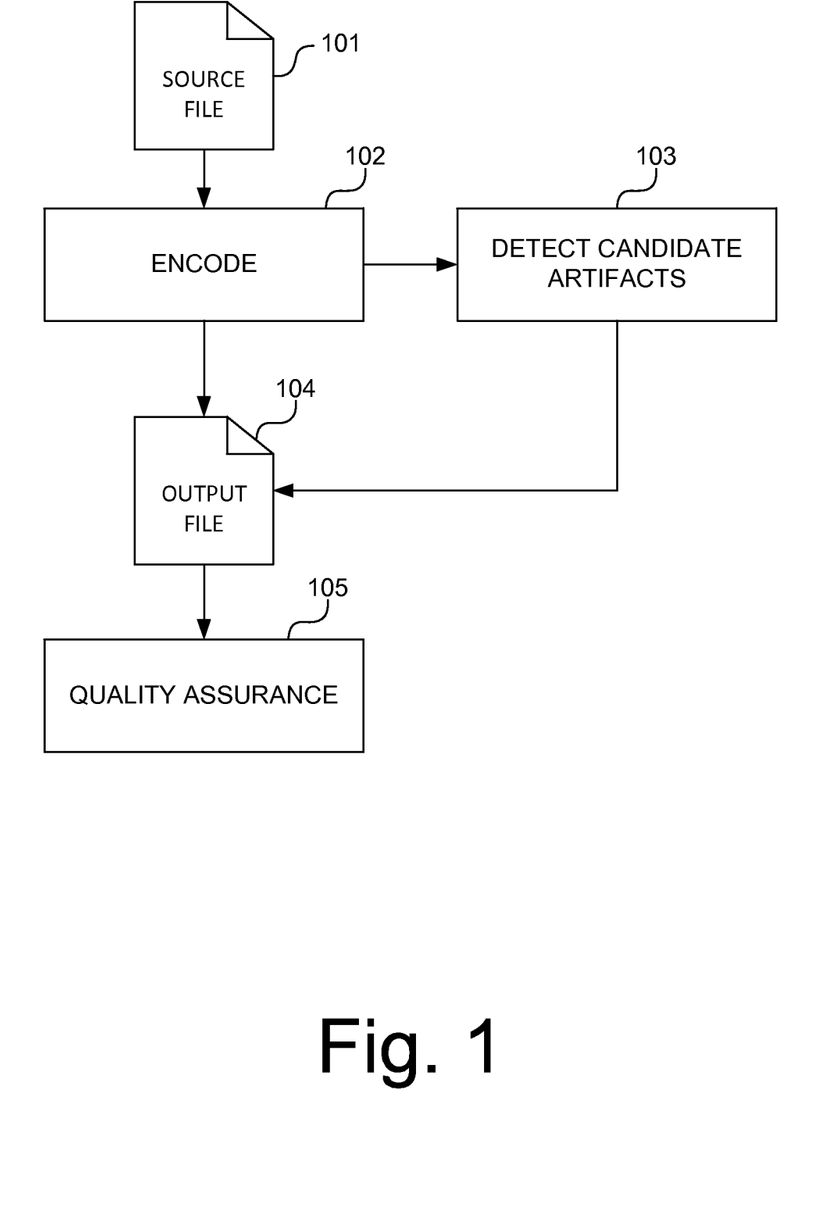
FIG. 1 illustrates a method of detecting candidate digital media artifacts or defects created by an encoding process.

FIG. 1 illustrates a method of detecting candidate digital media artifacts or defects created by an encoding process. Here, a source digital media file 101 is encoded 102 into an output digital media file 104. For example, the source digital media file 101 could be an uncompressed video file of a first format, the encoding process 102 could be an H.264 compliant encoding process, and the output file 104 could be a compressed video file or a file wrapper containing the compressed video file. As another example, the source digital media file 101 could be a previously compressed video file which is transcoded by encoding process 102 into the output file 104.

In step 103, the encoding process 102 is monitored to detect candidates for encoding artifacts or defects. In some implementations, the detection of candidates comprises monitoring how the encoder quantizes the amount of change between samples, while tracking the current sample's time codes. For example, the samples can be the individual frames of the original source file 101. The parameters that quantize the change between samples can be motion vectors, color spectrum shifts, or other quantizable attributes. The detection step 103 may further comprise comparing the quantized value to a static or dynamic threshold. The threshold condition is configured to be met when the quantized value indicates the sample is more likely to contain an artifact or defect than a typical sample. For example, in a video file, a quantized value meeting the threshold value might indicate a sample in a segment containing a great deal of motion. As another example, the threshold value may be met when a sample contains objects with high spatial frequencies.

When a sample includes a value that meets the threshold condition, the time code, or timestamp, of the sample may be stored. In some implementations, the time code is stored as metadata in the output file 104. For example, the timestamps of candidate samples may be stored as bookmarks or chapter marks in the output file 104. These bookmarks or chapter marks may be implemented using the common bookmark or chaptering information provided by existing digital media standards. In other implementations, instead of or in addition to storing the time stamp, a bookmark or chapter mark is placed a certain time before the candidate sample. For example, the chapter mark may be placed a number of seconds before the candidate sample, or at one or more I-frames before the candidate sample.

The stored timestamps may be used for quality assurance 105. For example, a manual or automatic quality control process may comprise viewing only portions of the output file 104 that are proximal to the timestamps of the candidate samples. For files that do not require full linear quality control passes, the embedded timestamp data accelerates the quality control process and allows for more precise control over manual scrubbing the file while preventing QA personnel from missing potential artifacts.

Figure 2:
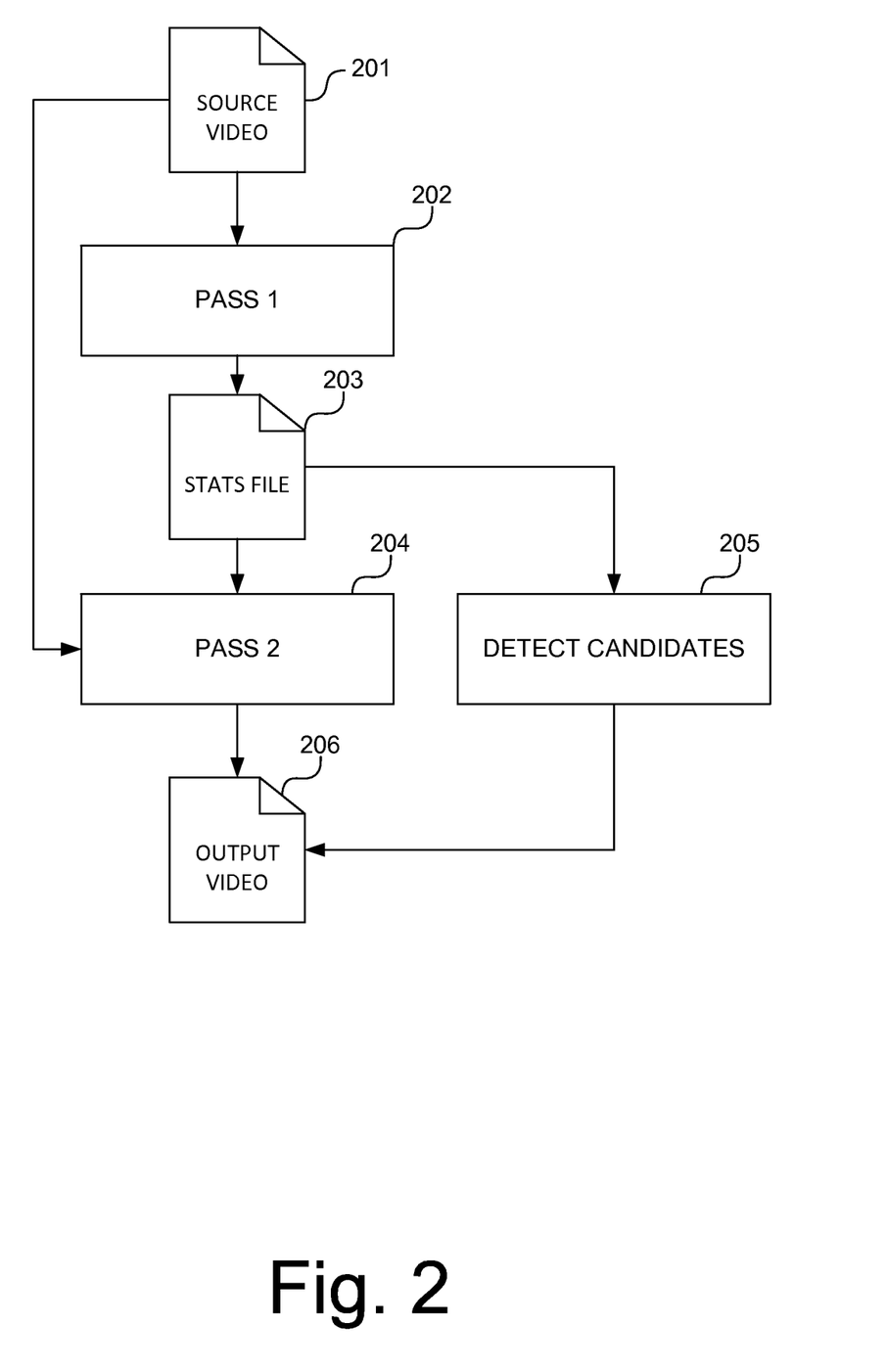
FIG. 2 illustrates a method of detecting candidate digital media artifacts or defects by inspecting a statistics file created during a first pass of a multi-pass encoding process.

Some encoders use multiple passes to efficiently allocate bits to meet coding constraints. FIG. 2 illustrates an implementation that monitors the encoding process by inspecting the output of a first pass of an encoder. In the illustrated method, a source file, such as video file 201, is subjected to a first pass of an encoder. For example, the first pass 202 could be conducted by an H.264 encoder such as x264. The output of the first pass 202 is a statistics file 203 ("stats file") that contains information about each sample of the source video. For example, the information can contain provisional identification of frame type, provisional allocation of bits to motion vectors, residuals, and provisional quantization parameter values. The encoder uses the stats file 203 to encode the source video 201 into the output video 206 in a second pass 204.

In step 205, the candidates for encoding artifacts or defects can be detected from the information contained in the stats file 203. For example, the bits provisionally allocated to motion vectors for each sample can be retrieved from the stats file 203 and thresholded to determine whether each sample is a candidate for an encoding artifact or defect. Step 205 may be performed before, after, or in parallel with the second encoding pass 204.

Alternatively, the second pass 204 may output an updated stats file in addition to the output video 206. The step of detecting candidate artifacts may be performed on the updated stats file produced by the second pass 204. Additionally, if more than two passes are performed, the method can detect candidate samples from the stats file produced in any of the encoding passes.

Figure 3:
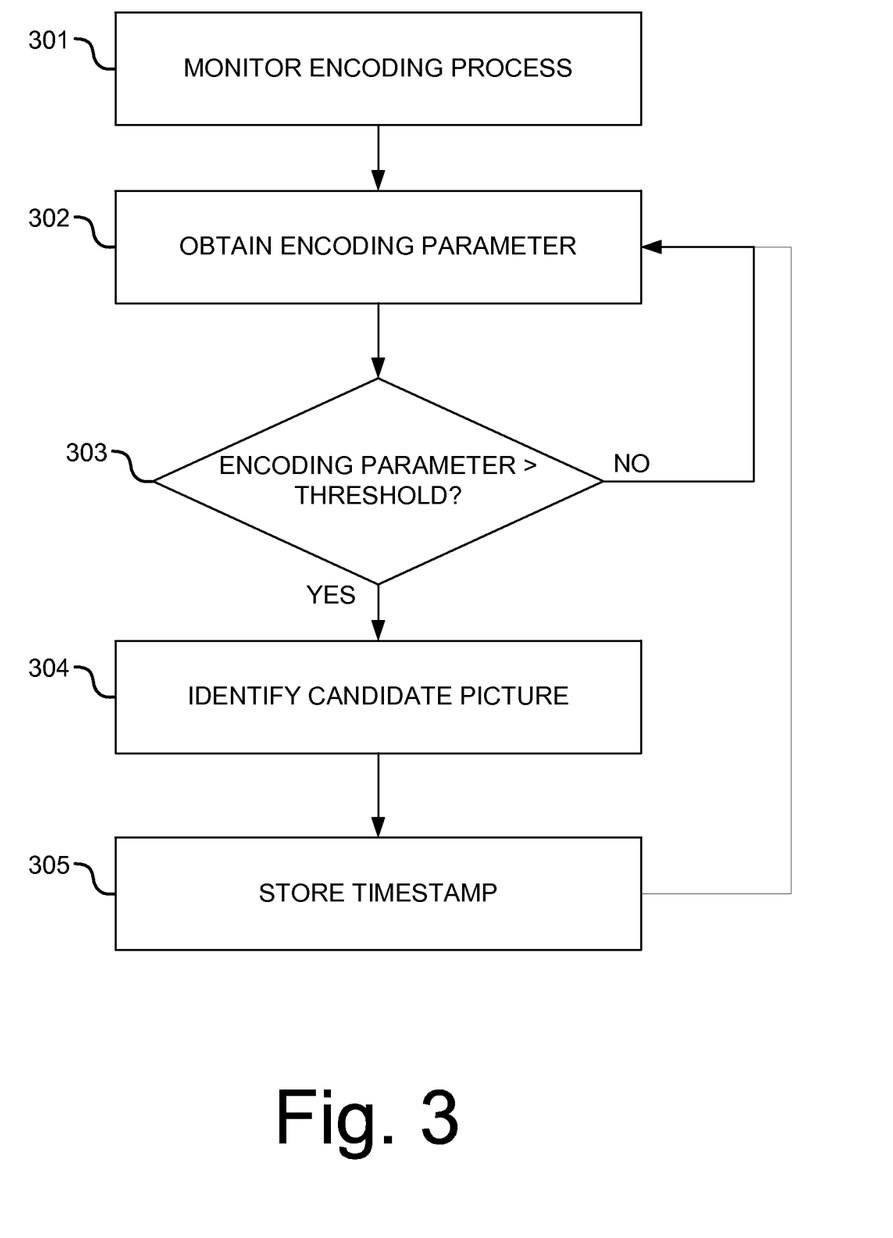
FIG. 3 illustrates a method of monitoring an encoding process to detect candidate digital media artifacts or defects created by an encoding process.

FIG. 3 illustrates an example of detecting artifact or defect candidates. The method comprises monitoring an encoding process 301 of a source video file. For example, the step of monitoring the encoding process 301 could comprise receiving a data output from an encoder while the encoder is encoding samples of the source video file. Alternatively, the step of monitoring the encoding process 301 could comprise reading information from a statistics file or other output file produced by an encoder.

The step of monitoring the encoding process 301 is used to obtain encoding parameters 302 that were used by the encoder to encode a picture or sample of the source video file. For example, the encoding parameters could comprise bits allocated to encoding: motion vectors, motion vector prediction, residuals, or the picture as a whole. Other encoding parameters can be encoding decisions made by the encoder such as spatial or temporal mode, quantization decisions, or other encoder specific decisions. The encoding parameters could also comprise any other quantifiable value, such as the instantaneous bitrate, or the difference in bitrate between the current sample and a previous sample. For example, the encoding parameter could be the difference in bitrate between the current sample and a previous sample of the same frame type as the current sample. The encoding parameter could also be the difference in a bitrate that the encoder would use for the current sample without a bitrate constraint (a non-rate-limited bitrate) and a maximum allowed bitrate.

In step 303, the encoding parameter is compared to a threshold value to determine if the current picture is a candidate for a coding artifact or defect. In some implementations, the threshold value is a static threshold that is applied for each sample in the video file. In further implementations, each frame type may have a separate static threshold. In particular, the static threshold may be the maximum permitted bitrate in the encoder settings. Other thresholds can be based on the type of decision the transcoder makes for motion detection and compensation, quantization method, or any other quantifiable component during digital video transcoding. In other implementations, the threshold value is a dynamic threshold. The dynamic threshold is determined from samples before, after, or before and after the current sample. For example, a dynamic threshold value could be computed as an average bitrate of X past samples, Y future samples, or a combination of past and future samples. The dynamic threshold may also be computed from past or future samples of the same frame type of the current sample. For example, if the current sample is an I-frame, the dynamic threshold could be computed from X previous and Y future I-frames, where X and Y could range from 1 sample to all past and future samples in the file. The dynamic threshold could further be defined based on a predetermined deviation from these values. For example, the comparison step 303 might only be triggered if the encoding parameter is greater than a certain deviation from a defined time-domain range of encoding characteristics. For example, the dynamic thresholds may be derived in real-time during the transcode process and to detect variance between the current frame/picture to a group of pictures from a predefined time domain range relative to the current frame/picture.

If the encoding parameter meets the comparison condition, the picture is identified 304 as a candidate for a coding artifact or defect. In step 305, the timestamp of the candidate picture is stored. In some implementations, one or more surrounding pictures might also be identified. For example, all pictures in the candidate's group of pictures could be identified as potential candidate pictures. The entire group of pictures could then marked by storing their timestamps.

After the current picture is evaluated, the method repeats with the next picture to be encoded. In some implementations, a series of pictures that meet the comparison condition are not separately marked as candidates. In these implementations, the entire series may be marked—for example, by chapter marking the first and last picture of the series.

Figure 4:
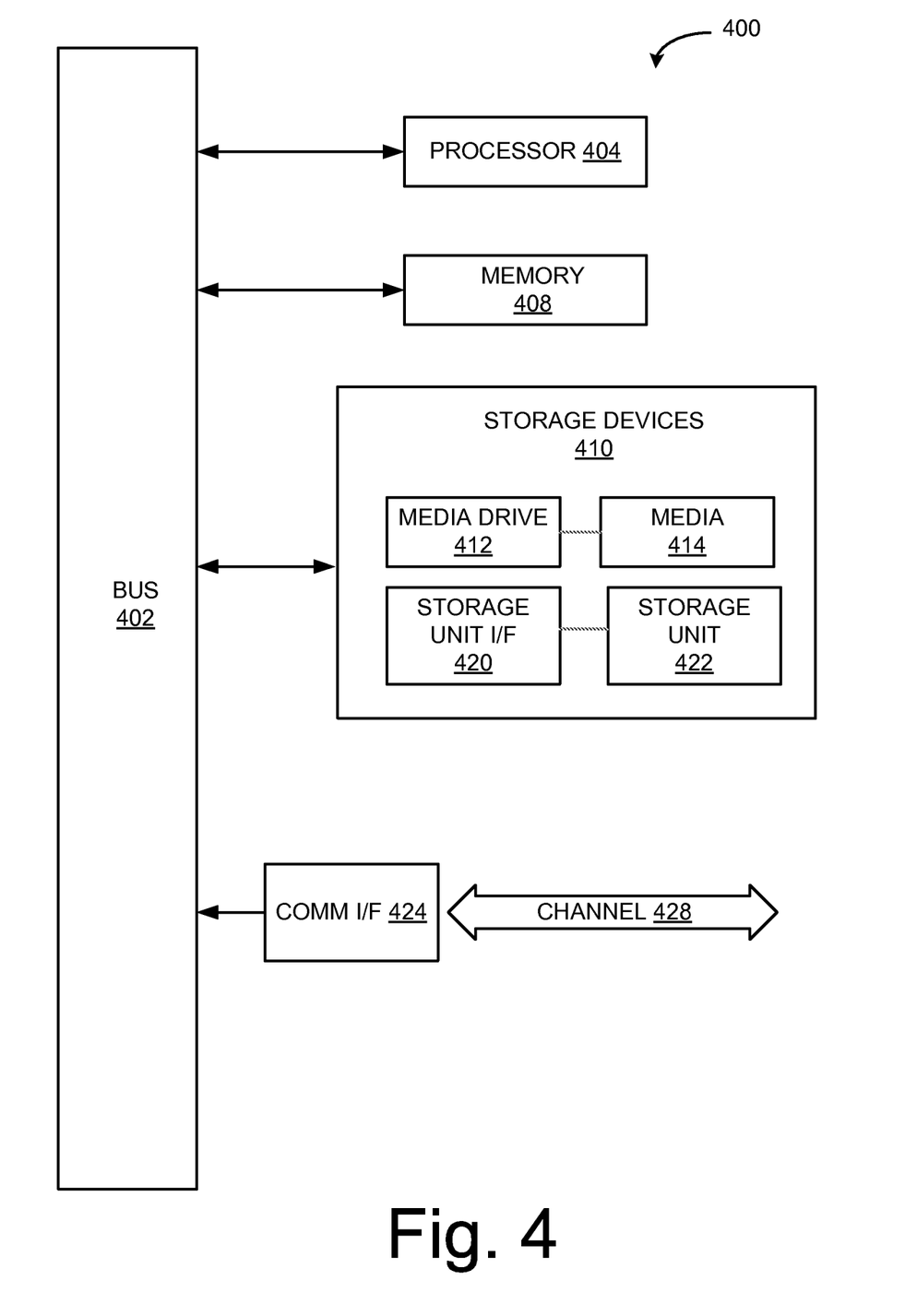
FIG. 4 illustrates an example computing module that may be used in implementing various features.

As used herein, the term module might describe a given unit of functionality that can be performed in accordance with one or more implementation. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the disclosure using other computing modules or architectures.

Referring now to FIG. 4, computing module 400 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. Memory may include any non-transitory storage medium. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although described above in terms of various exemplary embodiments and implementations, it should be understood that the various features, aspects and functionality described are not limited in their applicability to the particular embodiment with which they are described, but instead can be applied, alone or in various combinations, to one or more of the other embodiments, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of encoding a video content including a plurality of video frames having a first frame and a second frame preceding the first frame, the method comprising:
    monitoring an encoding process of the first frame that generates an encoded first frame;
    obtaining, during encoding of the first frame, a first amount of change between the first frame and the second frame;
    comparing the first amount of change between the first frame and the second frame with a threshold to determine whether the first frame is likely to contain a first defect;
    in response to determining that comparing indicates that the first frame is likely to contain the first defect, obtaining a first time code associated with the first frame; and
    storing the first time code in an output file.

2. The method of claim 1, wherein the plurality of video frames further includes a third frame, wherein the first frame precedes the third frame, the method further comprising:
    monitoring an encoding process of the third frame that generates to generate an encoded third frame;
    obtaining, during encoding of the third frame, a second amount of change between the third frame and the first frame;
    comparing the second amount of change between the third frame and the first frame with the threshold to determine whether the third frame is likely to contain a second defect;
    in response to determining that comparing indicates that the third frame is likely to contain the second defect, obtaining a second time code associated with the third frame; and
    storing the second time code in the output file.

3. The method of claim 2, further comprising:
    after the first time code and the second time code are stored in the output file, performing a quality assurance analysis of the output file using the first time code and the second time code stored in the output file as bookmarks to locate the encoded first frame and the encoded third frame.

4. The method of claim 1, further comprising:
    in response to determining that comparing indicates that the first frame is likely to contain the first defect, storing the first amount of change in a file.

5. The method of claim 4, wherein the file is the output file, the method further comprising:
    after the first time code and the first amount of change are stored in the output file, performing a quality assurance analysis of the output file using the first time code and the first amount of change.

6. The method of claim 1, wherein the first amount of change is an amount change in a color spectrum shift.

7. The method of claim 1, wherein the threshold has a static value.

8. The method of claim 1, wherein the threshold has a dynamic value.

9. A system for encoding a video content including a plurality of video frames having a first frame and a second frame preceding the first frame, the system comprising:
    a processor: and
    a memory;
    wherein the processor is configured to:
        monitor an encoding process of the first frame that generates an encoded first frame;
        obtain, during encoding of the first frame, a first amount of change between the first frame and the second frame;
        compare the first amount of change between the first frame and the second frame with a threshold to determine whether the first frame is likely to contain a first defect;

in response to determining that comparing indicates that the first frame is likely to contain the first defect, obtain a first time code associated with the first frame; and store the first time code in an output file.

10. The system of claim 9, wherein the plurality of video frames further includes a third frame, wherein the first frame precedes the third frame, and wherein the processor is further configured to:

monitor an encoding process of the third frame that generates an encoded third frame;

obtain, during encoding of the third frame, a second amount of change between the third frame and the first frame;

compare the second amount of change between the third frame and the first frame with the threshold to determine whether the third frame is likely to contain a second defect;

in response to determining that comparing indicates that the third frame is likely to contain the second defect, obtain a second time code associated with the third frame; and store the second time code in the output file.

11. The system of claim 10, wherein the processor is further configured to:

after the first time code and the second time code are stored in the output file, perform a quality assurance analysis of the output file using the first time code and the second time code stored in the output file as bookmarks to locate the encoded first frame and the encoded third frame.

12. The system of claim 9, wherein the processor is further configured to:

in response to determining that comparing indicates that the first frame is likely to contain the first defect, store the first amount of change in a file.

13. The system of claim 12, wherein the file is the output file, and wherein the processor is further configured to:

after the first time code and the first amount of change are stored in the output file, perform a quality assurance analysis of the output file using the first time code and the first amount of change.

14. The system of claim 9, wherein the first amount of change is an amount change in a color spectrum shift.

15. The system of claim 9, wherein the threshold has a static value.

16. The system of claim 9, wherein the threshold has a dynamic value.

* * * * *